United States Patent [19]

Griffin et al.

[11] Patent Number: 5,734,252
[45] Date of Patent: Mar. 31, 1998

[54] METHOD AND APPARATUS FOR CHARGING A BATTERY OF AN ELECTRONIC DEVICE USING AN INTELLIGENT EXTERNAL CHARGER

[75] Inventors: Lee Daniel Griffin, Raleigh; Ivan Nelson Wakefield, Cary, both of N.C.

[73] Assignee: Ericsson, Inc., Research Triangle Pk., N.C.

[21] Appl. No.: 770,860

[22] Filed: Dec. 20, 1996

[51] Int. Cl.$^6$ .................. H02J 7/00; H01M 10/44
[52] U.S. Cl. .................. 320/2; 320/15; 320/5; 320/29; 320/30
[58] Field of Search .................. 320/2, 15, 5, 48, 320/27, 28, 29, 30, 47

[56] References Cited

U.S. PATENT DOCUMENTS

| | | | |
|---|---|---|---|
| 4,700,375 | 10/1987 | Reed | 379/61 |
| 4,709,202 | 11/1987 | Koenck et al. | 320/48 X |
| 5,274,319 | 12/1993 | Keener et al. | 320/2 |
| 5,371,453 | 12/1994 | Fernandez | 320/5 |
| 5,420,493 | 5/1995 | Hargadon et al. | 320/15 |
| 5,511,240 | 4/1996 | Nishiyama | 455/127 |
| 5,534,765 | 7/1996 | Kreisinger et al. | 320/30 |
| 5,539,298 | 7/1996 | Perkins | 320/27 X |
| 5,572,110 | 11/1996 | Dunstan | 320/30 |
| 5,589,756 | 12/1996 | Wilson et al. | 320/22 |

*Primary Examiner*—Peter S. Wong
*Assistant Examiner*—K. Shin
*Attorney, Agent, or Firm*—Jenkens & Gilchrist, P.C.

[57] ABSTRACT

An apparatus and method for disabling the internal battery charging algorithm of an electric device when connected to a smart battery charger having its own internal controller and charging algorithm. The controller of the external battery charger varies the output of the charger to provide the battery with a current source that predictably varies in voltage or represents a digital signal at a preset data rate. The internal controller of the electronic device recognizes the varying nature of the supplied direct current and disables its own internal battery charging algorithm. The charging algorithm of the external battery charger thus independently controls the charging of the electronic device internal battery.

12 Claims, 3 Drawing Sheets

METHOD AND APPARATUS FOR CHARGING A BATTERY OF AN ELECTRONIC DEVICE USING AN INTELLIGENT EXTERNAL CHARGER

BACKGROUND OF THE INVENTION

1. Technical Field of the Invention

The present invention pertains in general to the charging of batteries, and more particularly, to the charging of a cellular telephone battery by an external charger while the battery is attached to a cellular telephone.

2. Description of Related Art

Techniques for charging batteries have improved in recent years. To achieve optimum charging of batteries, current methods incorporate a controller and one or more analog to digital convertors for monitoring various parameters during the charging process. Such parameters include ambient temperature, battery temperature, battery voltage, delta voltage, and charging time. These parameters are used in a charging algorithm implemented by the controller to output a charging signal and obtain optimum charging of the battery. When a battery attached to a cellular telephone is to be charged, a direct current is applied to the battery via a switch controlled by a cellular telephone microprocessor. The microprocessor, following a charging algorithm, closes and opens the switch in response to the various monitored parameters in accordance with the charging algorithm to generate the charging signal.

A problem arises, however, when the cellular telephone and battery are connected to an external battery charger which also contains a microprocessor and one or more analog to digital converters for implementing its own charging algorithm. The problem occurs when each of the controllers and their associated analog to digital converters attempt to independently and simultaneously control the charging of the battery attached to the cellular telephone resulting in less than optimal charging of the battery.

To avoid conflict between the two controllers and their charging algorithms, two approaches have been used in the past. In a first approach, the in-line cellular telephone controller and the external controller operate independently through the use of separate battery charging pins. The pins which are connected to a current source determine which controller controls the charging process. A second approach involves the use of a closed loop communication between the two microprocessors where parameters such as charge time, battery type, battery size, battery temperature, battery voltage, and delta voltage are exchanged between the two microprocessors. Each of these approaches is cumbersome, and therefore, it would be advantageous to provide an apparatus and method for charging of batteries which disables the internal charging algorithm of the cellular telephone when the cellular telephone and battery are attached to an external smart charger.

SUMMARY OF THE INVENTION

The present invention comprises an external battery charger having a controller for implementing a battery charging algorithm. The controller of the charger repetitively connects and disconnects a current source to the battery using a switch to produce a charging current which has a varying voltage level. An internal controller of a cellular telephone attached to the battery being charged senses the varying nature of the charging current, passes the charging current onto the battery, and disables its internal charging algorithm in response thereto to allow the controller of the external charger to control the charging process.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
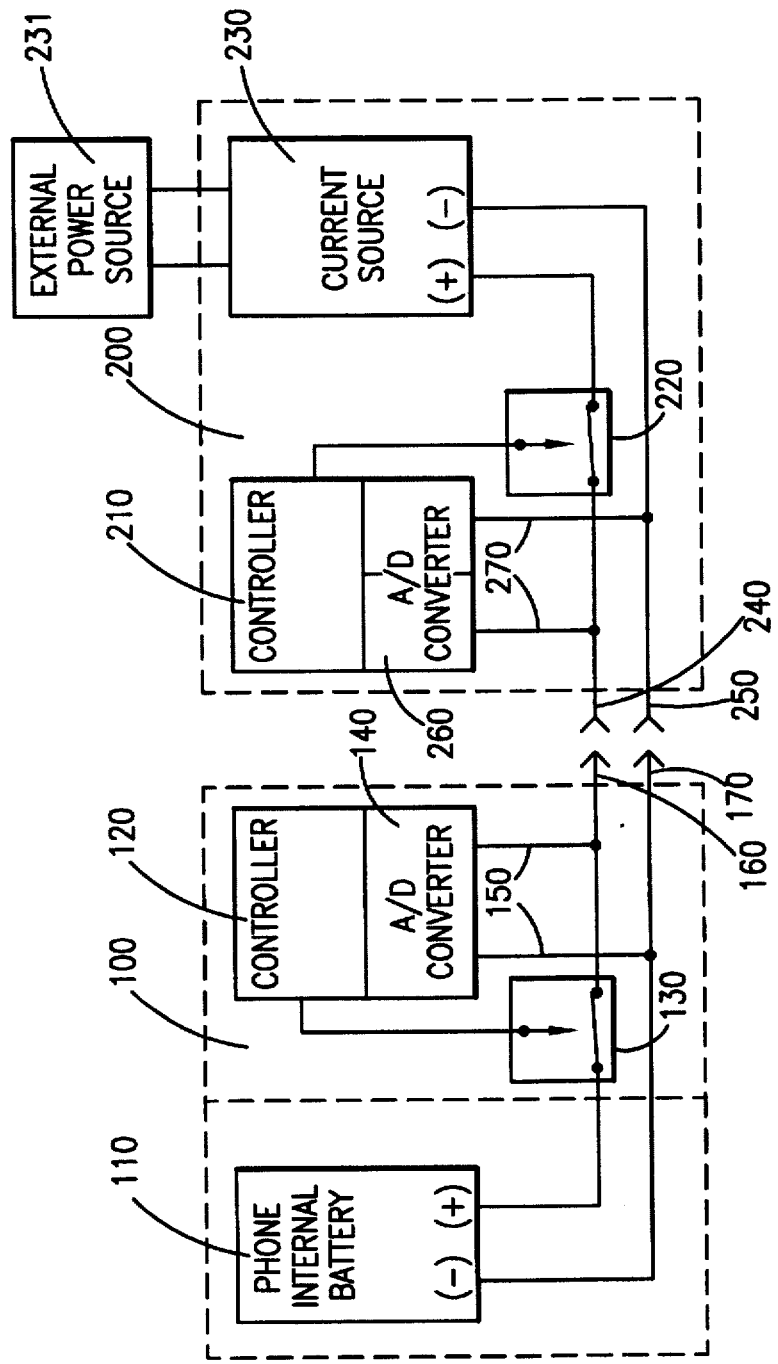
FIG. 1 is a functional block diagram of a system for charging a battery attached to a cellular telephone using an external charger in accordance with the present invention.

Referring now to FIG. 1, there is illustrated a functional block diagram of the present invention. A cellular telephone 100 is shown as electrically and physically attached to battery 110. The cellular telephone 100 includes an internal controller/microprocessor 120 which controls a switch 130. The cellular telephone further includes an analog to digital converter 140. The analog to digital converter 140 includes input lines 150 for sampling a voltage across a direct current input 160 and ground 170. The voltage levels sampled by the analog to digital converter 140 are communicated to the microprocessor 120 for use in controlling charging of the battery 110.

The internal controller 120 monitors various parameters of the charging process such as ambient temperature, battery temperature, battery voltage, and delta voltage for use in a charging algorithm. Based on the value of these parameters, the controller 120 follows a preprogrammed charging algorithm and accordingly opens and closes switch 130 to allow direct current output from a charger to be applied to charge the battery 110.

FIG. 1 further shows the connection of an intelligent external battery charger 200 to the telephone 100. Unlike a dumb charger which simply supplies current to the battery, an intelligent charger has a controller for controlling the charging of a battery. The battery charger 200 includes a controller 210 for controlling, among other functions, switch 220. Also included in the charger 200 is a current source 230, receiving power from an external power source 231. The external power source 231 can be either alternating or direct current. The current source 230 supplies direct current for the charging process via direct current output 240 and ground 250. The charger 200 further includes an analog to digital converter 260 having input lines 270 connected to the direct current output 240 and ground 250. The analog to digital converter 260 samples voltage levels across direct current output 240 and ground 250 and communicates the sampled voltage levels to the controller 210. Similar to controller 120 of the cellular telephone 100, the controller 210 uses the sampled voltage levels from the analog to digital converter 260 together with other measured parameters as inputs to a preprogrammed charging algorithm.

In situations where the cellular telephone battery 110 attached to the cellular telephone 100 is connected to the intelligent external charger 200, a conflict arises between operation of the controller 120 of the cellular telephone 100 and operation of the controller 210 of the external charger 200. Unless one of the controllers 120 or 210 is disabled each will attempt to simultaneously implement its own charging algorithm based on its monitored parameters.

In a first embodiment of the present invention, the controller 210 repeatedly turns switch 220 on and off to respectively connect and disconnect to and from the current source 230 resulting in the generation of a varying charger output voltage with a defined duty cycle and cycle period. The controller 210 chooses a duty cycle and cycle period such that the generated wave-form has distinct voltage values when sampled by an analog to digital converter. For example, if a duty cycle of fifty percent is chosen the charging voltage wave-form would have the general appearance of a square wave with the charging voltage superimposed on the battery voltage. Depending on the component values and tolerances, the duty cycle and cycle period are chosen so that the rise and fall times of the wave-form are insignificant as compared to the time that the charging current is applied to the battery 110. Furthermore, the analog to digital converter 140 samples the wave-form in synchronization with any known circuit switching such as alternating current ripple frequency and power supply switching characteristics to prevent false voltage level readings. The defined duty cycle and cycle period and repetitive nature of the signal distinguishes the signal as intentional and not spurious noise. To initiate the charging process the cellular telephone 100 and battery 110 are placed in a slot of the charger 200 so that the direct current input 160 of the cellular telephone 100 is connected to the direct current output 240 of the charger 200 and the ground 170 of the cellular telephone 100 is connected to the ground 250 of the charger 200. Although a single charging slot is shown, the charger 200 may have multiple slots. The analog to digital converter 140 of the cellular telephone 100 monitors the varying voltage level across its input lines 150 and communicates the sampled voltage levels to the controller 120. Controller 120 recognizes that the voltage reaching the cellular telephone 100 from the charger 200 is varying with a defined duty cycle and cycle period. The varying voltage distinguishes the charger 200 as a smart charger having an independent controller 210 for implementing a charging algorithm as compared to a dumb charger which supplies the cellular telephone 100 with a continuous current. The controller 120, realizing that the charger 200 is equipped with its own controller 210 for controlling the charging of the cellular telephone battery 110, insures that switch 130 is closed to allow the charging current from current source 230 to reach the internal battery 110 of the cellular telephone 100. The controller 120 deactivates its own internal control algorithm for charging of the battery 110 and allows the controller 210 to implement its internal charging algorithm. If charger 200 provides a non-varying signal to the cellular telephone 100, the cellular telephone 100 implements its internal charging algorithm.

Although the controller 120 disables its own internal charging algorithm for as long as a varying voltage is present across the direct current input 160 and ground 170, the controller 120 continues to monitor various parameters such as the ambient temperature, battery voltage, battery temperature, and total charging time to insure that these parameters do not exceed maximum charging limits. Should these limits be exceeded, the controller 120 opens switch 130 to terminate the charging process and protect the battery from damage. In addition to monitoring for too high of a battery voltage value, the controller 120 also checks for too low of a voltage which would indicate a short circuit.

In a second embodiment of the present invention, the controller 210 selectively turns switch 220 on and off to create a repetitive digital binary signal across direct current output 240 and ground 250 which is recognized by the controller 120. This repetitive digital signal can be preset to any data rate and may or may not have a start and stop bit. The repetitive digital signal can also represent an eight bit ASCII code which can be associated with messages or instructions from the charger related to the charging process. Furthermore, the data rate can be a family of data rates, such that one data rate and corresponding digital code and another different data rate and corresponding digital code could signal concurrently the action to start or terminate the changing algorithm. The direct current for charging of the battery 110 comprises a digital signal and the analog to digital converter 140 samples the signal across its input lines 150 and communicates the sampled signal to controller 120. The controller 120 recognizes this digital signal, and as in the earlier embodiment of the present invention, closes switch 130 to allow charging of the battery 110. As in the earlier embodiment, controller 120 continues to monitor various parameters such as ambient temperature, battery voltage, battery temperature, and total charging time to open switch 130 if maximum or minimum values for these parameters are exceeded.

In each of the embodiments of the present invention thus far described, the controller 120 of the cellular telephone 100 relinquishes control for charging of the battery 110 to the controller 210 of the external charger 200. Thus, the controller 210 following its internal charging algorithm turns switch 220 on and off to charge the battery 110. Unlike situations where a dumb charger provides the battery 110 with a continuous current, the embodiments of the present invention supply the phone battery 110 with a current that is switched on and off repetitively, and therefore, varies in voltage. The varying nature of the supplied voltage will not adversely affect the charging of the battery 110, however, the charging time will increase.

Figure 2:
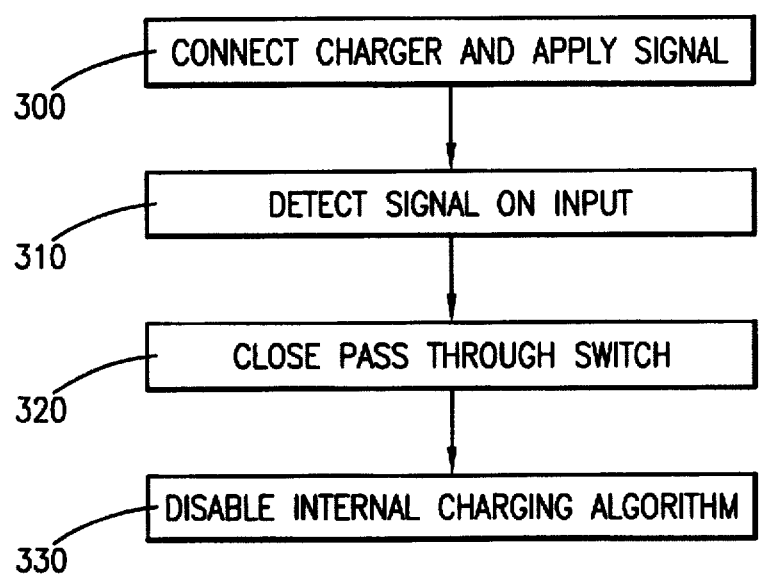
FIG. 2 is a flow diagram describing the process for disabling the internal charging algorithm of a cellular telephone in accordance with the present invention.

Referring additionally now to FIG. 2, there is illustrated a flow diagram illustrating the process for disabling the internal charging algorithm of a cellular telephone in accordance with the present invention. To initiate the charging process, the cellular telephone 100 and battery 110 are placed in a slot of the external charger 200 and the charging current is applied to direct current input 160 and ground 170 (step 300). The insertion of the cellular telephone 100 and battery 110 results in a voltage drop detected by the analog to digital converter 260 thereby informing the charger 200 to begin charging. In the preferred embodiment of the present invention, switches 130 and 220 are normally closed thereby allowing the drop in voltage detected by the analog to digital converter 260. In an embodiment where either switch 130 or 220 is normally open, provisions would need to be made to periodically close the switch to allow analog to digital converter 260 to detect a voltage drop caused by insertion of the cellular telephone 100 and battery 110 into a charging slot of charger 200. The controller 210 of the charger 200 turns switch 220 on and off to create either,a charger output with a varying voltage or to create a digital binary signal as an output charging current. In either event, the controller 120 of cellular telephone 100 detects the varying nature of the applied signal (step 310) and insures that switch 130 is closed (step 320) to allow charging of the battery 110. The controller 120 also disables its internal charging algorithm (step 330) to allow the controller 210 of the charger 200 to control the charging process.

Figure 3:
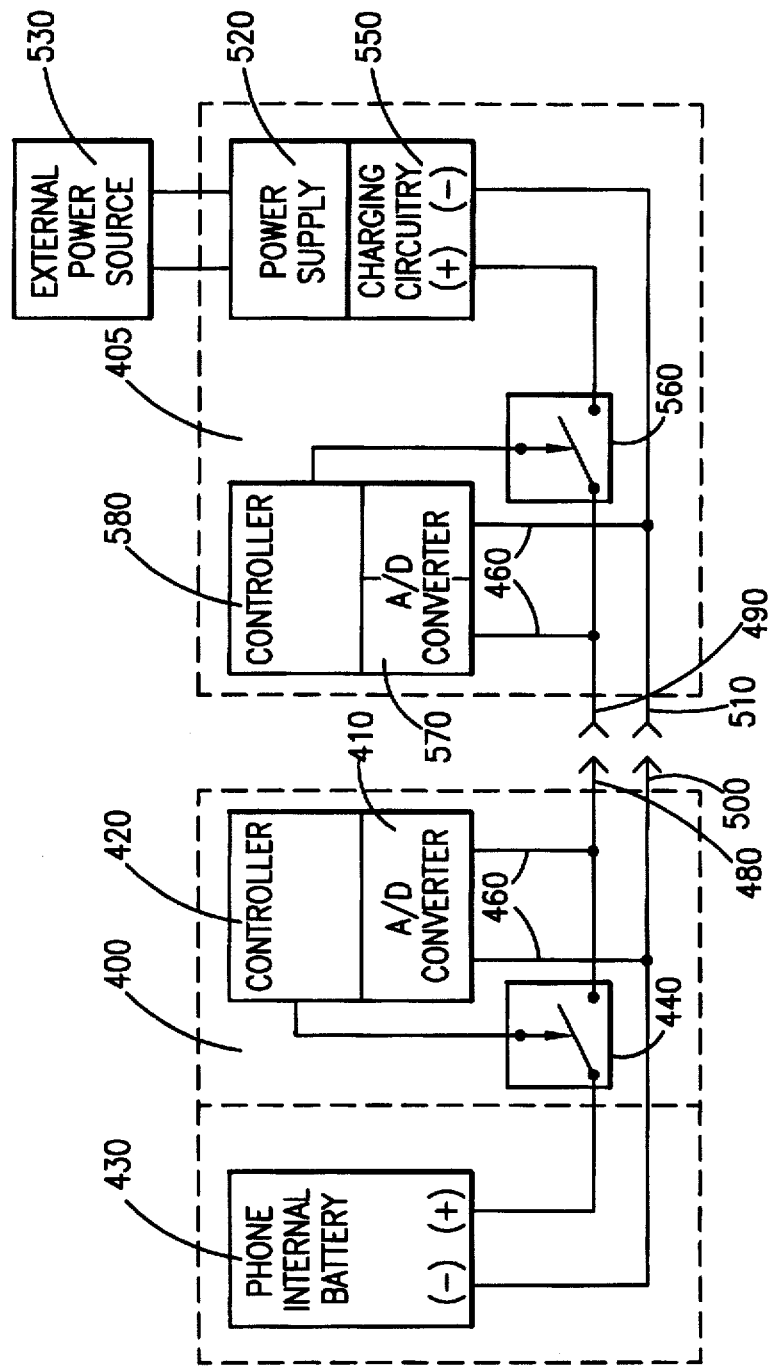
FIG. 3 is a functional block diagram of an embodiment of the present invention wherein communication messages are transmitted in both directions between a charger and a device to be charged.

Referring additionally now to FIG. 3, there is illustrated a functional block diagram for a third and fourth embodiment of the present invention where an electronic device 400 and a battery charger 405 can each communicate with the other. Unlike previous embodiments of the present invention, where communication is unidirectional from the battery charger to the electronic device, the embodiment depicted in FIG. 3 allows for communication in both directions. Furthermore, while the earlier embodiments simply deactivated the internal charging algorithm of the electronic device, the embodiment depicted in FIG. 3 allows the electronic device 400 and battery charger 405 to also send communication messages between each other. This bidirectional communication between the controls 420 and 580 include such messages as charge started, charge interrupted, charge waiting, charge completed, charging error, reason for charge completion, type of battery, size of battery, set charging status, read charging status, and etc.

The electronic device 400 includes an analog to digital converter 410, a controller 420, an internal battery 430, and a switch 440. The analog to digital converter 410 samples voltage levels on the charging bus 460 and communicates the sampled signal to the controller 420 in accordance with the previous embodiment. To send messages over the charging bus 460, the controller 420 sends control signals to turn switch 440 on and off. The switch 440 connects battery 430 of the electronic device 400 to the charging bus 460. By turning the switch 440 on and off, the controller 420 can modulate the voltage on charging bus 460.

Direct current input 480 and direct current output 490 connect and extend the charging bus 460 of the electronic device 400 to the charging bus 460 of the external battery charger 405. Likewise, ground pins 500 and 510 connect the grounds of the electronic device 400 and the external battery charger 405 to each other.

The external battery charger 405 includes a power supply 520 connected to an external power source 530. The external power source 530 can be either alternating or direct current. The power supply 520 supplies power to the external battery charger 405. The external battery charger 405, also includes charging circuitry 550, switch 560, analog to digital converter 570, and controller 580. The analog to digital converter 570 receives communication messages over the charging bus 460 in accordance with the previous embodiment, and communicates the communication messages to the controller 580. To send communication messages to the electronic device 400, the controller 580 sends commands to the switch 560, which turns the switch 560 on and off. The switch 560 allows charging power from the charging circuitry 550 to reach the charging bus 460. By turning switch 560 on and off the controller modulates the charging voltage on the charging bus 460.

Depending on wether the electronic device 400 or the charger 405 is turning on and off switches 440 and 560 respectively the voltage sampled by the analog to digital converters 410 and 570 will vary between four voltage levels. When the electronic device 400 sends messages to the charger 405, the voltage varies between an open charger voltage (switch 440 open and switch 560 closed) and a voltage of the battery 430 being charged (switch 440 closed and switch 560 closed). This latter voltage slowly increases as the battery charges. On the other hand, when the charger 405 sends messages to the electronic device 400, the voltage varies between the previously mentioned voltage of the battery 430 being charged (switch 440 closed and switch 560 closed) which slowly increases as the battery charges and a battery voltage (switch 440 closed and switch 560 opened).

Lastly, if both switch 440 and switch 560 are open the voltage floats at an undetermined level.

In a third embodiment of the present invention, the charging bus 460 is powered by unfiltered rectified current. The unfiltered rectified current contains a voltage ripple which has a frequency equal to the external power source frequency for a half-waved rectified signal and twice the external power source frequency for a full-wave rectified signal. Controllers 420 and 580 turn switches 440 and 560, respectively, on and off in synchronization with the ripple frequency present on the charging bus 460 to prevent false voltage level readings during transitions between low and high voltage levels.

In a fourth embodiment of the present invention, the charging bus 460 is powered by continuous direct current. In this situation, there is no ripple frequency which the controllers 420 and 580 synchronize to. Therefore, controllers 420 and 580 can turn switches 440 and 460, respectively, on and off at any preset data rate.

In both the third and fourth embodiments of the present invention, the electronic device 400 and external battery charger 405 normally monitor the charging bus 460. Communication messages begin with a start sequence, for example, a high to low transition which both devices listen for to indicate the beginning of a communication message. The starting sequence is followed by a binary code which represents a command or message. After sending a communication message, the sending device returns to monitoring the charging bus 460 for the start sequence.

Although the description of the present invention gives an example of a cellular telephone as the electronic device whose attached battery is being recharged, it is understood that the present invention applies to any electronic device having an internal charging algorithm for charging an attached battery including single and multi-slot chargers.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A system for overriding an internal controller recharging algorithm of an electronic device when the electronic device is connected to an external battery charger having an independent controller comprising:

means for producing a varying voltage having a defined duty cycle and cycle period on a charging current by the external battery charger;

means for detecting the varying voltage on the charging current by the electronic device; and means for disabling the internal controller recharging algorithm in response to detection of the varying voltage.

2. The system recited in claim 1, wherein the means for producing the varying voltage on the charging current comprises a switch controlled by the external battery charger which turns the charging current on and off.

3. The system recited in claim 1, wherein the means for detecting the varying voltage on the charging current comprises an analog to digital converter for sampling voltage levels of the charging current.

4. The system recited in claim 1, wherein the means for disabling the internal controller comprises the internal controller disabling the recharging algorithm in response to recognition by the controller of the sampled voltage levels communicated from the analog to digital converter as varying in voltage.

5. A system for overriding an internal controller recharging algorithm of an electronic device when the electronic device is connected to an external battery charger having an independent controller comprising:

a direct current output of the external battery charger for connecting to a direct current input of the electronic device, the external battery charger producing a repetitive digital signal on the direct current output;

a means for detecting the repetitive digital signal on the direct current input; and a means for disabling the internal controller recharging algorithm in response to detection of the repetitive digital signal on the direct current input.

6. The system recited in claim 5, wherein the means for detecting the repetitive digital signal on the direct current input comprises an analog to digital converter for sampling voltage levels at the direct current input.

7. The system recited in claim 6, wherein the means for detecting the repetitive digital signal further includes the analog to digital converter communicating the sampled voltage levels to the internal controller, the internal controller recognizing the sampled voltage levels as the repetitive signal, and the internal controller disabling the internal controller recharging algorithm in response to recognition of the repetitive digital signal.

8. An system for overriding an internal controller recharging algorithm of an electronic device when the electronic device is connected to an external battery charger having an independent controller comprising:

a direct current output of an external battery charger for applying a repetitive digital signal to a direct current input of the electronic device;

an analog to digital converter for generating a sampled voltage level of the voltage level applied to the direct current input; and an internal controller recognizing the sampled voltage level as the repetitive digital signal and disabling the recharging algorithm in response to the recognition.

9. A method for overriding an internal controller recharging algorithm of an electronic device when the electronic device is connected to an external battery charger having an independent controller comprising the steps of:

connecting an external battery charger to a direct current input of the electronic device to facilitate recharging of an electronic device battery, the external battery charger producing a varying direct current voltage having a defined duty cycle and cycle period;

detecting the varying direct current voltage at the direct current input of the electronic device;

connecting the direct current input to the electronic device battery in response to detection of the varying direct current voltage; and disabling the internal controller recharging algorithm during recharging of the electronic device battery by the external battery charger in response to detection of the varying direct current voltage.

10. A method for overriding an internal controller recharging algorithm of an electronic device when the electronic device is connected to an external battery charger having an independent controller comprising the steps of:

connecting an external battery charger to a direct current input of the electronic device to facilitate recharging of an electronic device battery, the external battery charger producing a repetitive digital signal;

detecting the repetitive digital signal present at the direct current input of the electronic device;

connecting the direct current input to the electronic device battery in response to detection of the repetitive digital signal; and disabling the internal controller recharging algorithm of the electronic device during recharging of the electronic device battery by the external battery charger in response to detection of the repetitive digital signal.

11. A system for communicating between an electronic device and an external battery charger comprising:

a charging bus connecting the electronic device to the external battery charger;

a first analog to digital converter located within the electronic device for receiving communication messages over the charging bus;

a first switch located within the electronic device connecting the charging bus to a battery of the electronic device, the first switch for modulating the battery output to send communication messages over the charging bus;

a second analog to digital converter located within the external battery charger for receiving communication messages over the charging bus; and a second switch located within the external battery charger connecting the charging bus to a charging power supply of the external battery charger, the second switch for modulating the charging power supply output to send communication messages over the charging bus.

12. An apparatus for sending and receiving communication messages over a charging bus comprising:

an analog to digital converter for receiving communication messages over the charging bus;

a switch for connecting the charging bus to a power supply for modulating the power supply output applied to the charging bus; and a controller for controlling the switch for sending communication messages over the charging bus.

* * * * *